(12) United States Patent
Nguyen et al.

(10) Patent No.: US 8,486,702 B2
(45) Date of Patent: *Jul. 16, 2013

(54) METHOD OF TRACKING FLUIDS PRODUCED FROM VARIOUS ZONES IN SUBTERRANEAN WELL

(75) Inventors: Philip D. Nguyen, Duncan, OK (US); Jimmie D. Weaver, Duncan, OK (US); Johnny A. Barton, Marlow, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 8 days.

This patent is subject to a terminal disclaimer.

(21) Appl. No.: 13/534,282

(22) Filed: Jun. 27, 2012

(65) Prior Publication Data

US 2012/0264660 A1 Oct. 18, 2012

Related U.S. Application Data

(60) Division of application No. 10/777,412, filed on Feb. 12, 2004, now Pat. No. 8,354,279, which is a division of application No. 10/298,825, filed on Nov. 18, 2002, now Pat. No. 6,725,926, which is a continuation-in-part of application No. 10/125,171, filed on Apr. 18, 2002, now Pat. No. 6,691,780.

(51) Int. Cl.
*G01N 33/28* (2006.01)
*C09K 8/80* (2006.01)
*E21B 47/10* (2012.01)

(52) U.S. Cl.
USPC ............. 436/27; 436/25; 436/31; 507/203; 507/934; 166/280.2

(58) Field of Classification Search
USPC ....... 507/203, 934; 436/25, 27, 31; 166/280.2
See application file for complete search history.

(56) References Cited

U.S. PATENT DOCUMENTS

| | | | | |
|---|---|---|---|---|
| 2,643,228 A | * | 6/1953 | Bond et al. ................. | 137/13 |
| 2,675,354 A | * | 4/1954 | McChrystal et al. ......... | 507/263 |
| 3,507,620 A | * | 4/1970 | Gurney ........................ | 436/27 |
| 3,856,468 A | * | 12/1974 | Keller ........................ | 436/27 |
| 3,878,890 A | * | 4/1975 | Fertl et al. ................. | 166/252.2 |
| 4,473,669 A | * | 9/1984 | Rupert et al. ................. | 521/177 |
| 4,542,789 A | * | 9/1985 | Stapp ........................ | 166/402 |
| 5,420,174 A | * | 5/1995 | Dewprashad ................. | 523/130 |
| 5,582,250 A | * | 12/1996 | Constien ..................... | 166/280.1 |
| 5,849,590 A | * | 12/1998 | Anderson et al. ............... | 436/27 |
| 6,691,780 B2 | * | 2/2004 | Nguyen et al. ............. | 166/254.1 |
| 6,725,926 B2 | * | 4/2004 | Nguyen et al. ............. | 166/254.1 |
| 8,354,279 B2 | * | 1/2013 | Nguyen et al. ............. | 436/27 |
| 2004/0162224 A1 | * | 8/2004 | Nguyen et al. ............. | 507/200 |

FOREIGN PATENT DOCUMENTS

WO     WO 00/05302 A * 2/2000

OTHER PUBLICATIONS

Lewis, Richard J., Sr. (2002) Hawley's Condensed Chemical Dictionary (14th Edition), John Wiley & Sons, Online @ http://knovel.com/web/portal/browse/display?_EXT_KNOVEL_DISPLAY_bookid=704&VerticalID=0 , headword=A-stage resin, (Knovel Release Date: Sep. 4, 2003; downloaded Aug. 26, 2012), pp. 1.*

* cited by examiner

*Primary Examiner* — Daniel S Metzmaier
(74) *Attorney, Agent, or Firm* — Robert A. Kent; McDermott Will & Emery LLP

(57) ABSTRACT

A traceable treatment composition for treating a subterranean formation having multiple zones penetrated by a well bore comprising a homogenous blend of a tracking composition and a resin composition. The tracking composition comprises a substantially non-radioactive tracking material selected from the group consisting of a metal salt. The metal portion of the metal salt may be selected from the group consisting of gold, silver, lithium, molybdenum, and vanadium. The metal salt may also be selected from the group consisting of: barium bromide, barium iodide, beryllium fluoride, beryllium bromide, beryllium chloride, cadmium bromide, cadmium iodide, chromium bromide, chromium chloride, chromium iodide, cesium bromide, cesium chloride, sodium bromide, sodium iodide, sodium nitrate, sodium nitrite, potassium iodide, potassium nitrate, manganese bromide, zinc bromide, zinc iodide, sodium monofluoroacetate, sodium trifluoroacetate, sodium 3-fluoropropionate, potassium monofluoroacetate, potassium trifluoroacetate, and potassium 3-fluoropropionate.

4 Claims, No Drawings

METHOD OF TRACKING FLUIDS PRODUCED FROM VARIOUS ZONES IN SUBTERRANEAN WELL

CROSS-REFERENCE TO RELATED APPLICATIONS

This application is a divisional application of co-pending U.S. patent application Ser. No. 10/777,412, filed Feb. 12, 2004 and published as U.S. 2004/0162224, the entire disclosure of which is incorporated herein by reference, and which itself is a divisional application of U.S. patent application Ser. No. 10/298,825, filed Nov. 18, 2002 and now patented as U.S. Pat. No. 6,725,926, the entire discloser of which is incorporated herein by reference, and which itself is a continuation-in-part of U.S. patent application Ser. No. 10/125,171, filed Apr. 18, 2002 and now patented as U.S. Pat. No. 6,691,780, the entire disclosure of which is incorporated herein by reference.

BACKGROUND

The present embodiment relates generally to the recovery of hydrocarbons from a subterranean formation penetrated by a well bore and more particularly to non-radioactive compositions and methods of utilizing the non-radioactive compositions for determining the source of treatment fluids being produced from a production formation having multiple zones. For example, the compositions and methods can be utilized for tracking the transport of particulate solids during the production of hydrocarbons from a subterranean formation penetrated by a well bore.

Transport of particulate solids during the production of hydrocarbons from a subterranean formation penetrated by a well bore is a continuing problem. The transported solids can erode or cause significant wear in the hydrocarbon production equipment used in the recovery process. The solids also can clog or plug the well bore thereby limiting or completely stopping fluid production. Further, the transported particulates must be separated from the recovered hydrocarbons adding further expense to the processing. The particulates which are available for transport may be present due to an unconsolidated nature of a subterranean formation and/or as a result of well treatments placing particulates in a well bore or formation, such as, by gravel packing or propped fracturing.

In the treatment of subterranean formations, it is common to place particulate materials as a filter medium and/or a proppant in the near well bore area and in fractures extending outwardly from the well bore. In fracturing operations, proppant is carried into fractures created when hydraulic pressure is applied to these subterranean rock formations to a point where fractures are developed. Proppant suspended in a viscosified fracturing fluid is carried outwardly away from the well bore within the fractures as they are created and extended with continued pumping. Upon release of pumping pressure, the proppant materials remain in the fractures holding the separated rock faces in an open position forming a channel for flow of formation fluids back to the well bore.

Proppant flowback is the transport of proppants back into the well bore with the production of formation fluids following fracturing. This undesirable result causes undue wear on production equipment, the need for separation of solids from the produced hydrocarbons and occasionally also decreases the efficiency of the fracturing operation since the proppant does not remain within the fracture and may limit the width or conductivity of the created flow channel.

Current techniques for controlling the flowback of proppants include coating the proppants with curable resin, or blending the proppants with fibrous materials, tackifying agents or deformable particulates (See e.g. U.S. Pat. No. 6,328,105 to Betzold, U.S. Pat. No. 6,172,011 to Card et al. and U.S. Pat. No. 6,047,772 to Weaver et al.) For a multi-zone well that has been fractured with proppant and is plagued with proppant flowback problems, it is quite difficult to identify the zone from which the proppant is emanating unless the proppant is tagged with a tracer. Radioactive materials have been commonly used in the logging or tagging of sand or proppant placement, however, such radioactive materials are hazardous to the environment and the techniques for utilizing such radioactive materials are complex, expensive and time consuming. Therefore, there is a need for simple compositions and methods for tracking the flowback of proppant in subterranean wells to avoid the above problems.

DETAILED DESCRIPTION

According to one embodiment, to determine from which zone(s) a fluid is being produced, a water soluble inorganic or organic salt is dissolved in the base treatment fluid as the fluid is being pumped downhole during the treatment. Such treatment fluids include but are not limited to fracturing fluids, drilling fluids, disposal fluids and injection fluids used as displacement fluids in hydrocarbon recovery processes. Acting as a fluid tracer agent, a salt is tagged into the fluid that is unique for each treatment job such as a fracturing job treatment. Suitable water soluble salts for this purpose are metal salts in which the metal is selected from Groups I to VIII of the Periodic Table of the Elements as well as the lanthanide series of rare earth metals so long as the metal salts do not constitute a component of fluids naturally present in the formation and are compatible with the fluids injected into the formation. Preferred metals include barium, beryllium, cadmium, chromium, cesium, sodium, potassium, manganese and zinc. Particularly preferred water soluble salts include barium bromide, barium iodide, beryllium fluoride, beryllium bromide, beryllium chloride, cadmium bromide, cadmium chloride, cadmium iodide, cadmium nitrate, chromium bromide, chromium chloride, chromium iodide, cesium bromide, cesium chloride, sodium bromide, sodium iodide, sodium nitrate, sodium nitrite, potassium iodide, potassium nitrate, manganese bromide, manganese chloride, zinc bromide, zinc chloride, zinc iodide, sodium monofluoroacetate, sodium trifluoroacetate, sodium 3-fluoropropionate, potassium monofluoroacetate, potassium trifluoroacetate, potassium 3-fluoropropionate.

The fluid tracer agents used in the method of this embodiment must meet a number of requirements. They should be relatively inexpensive, must be compatible with fluids naturally present in the reservoir and within the rock itself, as well as be compatible with the fluids injected into the reservoir as part of the formation treatment. The fluid tracer agents must be susceptible to being readily detected qualitatively and analyzed quantitatively in the presence of the materials naturally occurring in the formation fluids. For example, an aqueous sodium chloride solution could be utilized as a fluid tracer agent but for the fact that most field brines contain sodium chloride in substantial quantities, and so detection and analysis to differentiate the presence of sodium chloride used as tracer in the presence of naturally-occurring sodium chloride would be difficult.

In field application, a known amount of a selected water soluble salt based on a known concentration (i.e. 100 parts per million) is dissolved in a volume of water which is $1/1,000$ of the total actual volume of base fluid required for the treatment. The mixed solution is then metered to the base fluid line at a rate of one gallon per 1,000 gallons of the base fluid. To handle multiple zones, various salts can be used provided that the interest cations or anions of selected compounds are unique to prevent any interference between zones.

According to another embodiment, metals are tagged onto proppant material or materials to be blended with proppant material to provide for the ready identification of flowback proppant from different stages or zones of the well. Suitable metals for this purpose may be selected from Groups I to VIII of the Periodic Table of the elements as well as the lanthanide series of rare earth metals so long as the metals do not constitute a component of the proppant, the fracturing fluid or the reservoir fluid and so long as the metals are compatible with the fracturing fluid. Preferred metals include gold, silver, copper, aluminum, barium, beryllium, cadmium, cobalt, chromium, iron, lithium, magnesium, manganese, molybdenum, nickel, phosphorus, lead, titanium, vanadium and zinc as well as derivatives thereof including oxides, phosphates, sulfates, carbonates and salts thereof so long as such derivatives are only slightly soluble in water so that they remain intact during transport with the proppant from the surface into the fractures. Particularly preferred metals include copper, nickel, zinc, cadmium, magnesium and barium. The metal acts as a tracer material and a different metal is tagged onto the proppant, or onto the materials to be blended with the proppant, so that each proppant stage or each fracturing job treatment can be identified by a unique tracer material. Suitable metals for use as the tracer material are generally commercially available from Sigma-Aldrich, Inc. as well as from Mallinckrodt Baker, Inc. It is understood, however, that field grade materials may also be used as suitable tracer materials for tagging onto proppant material or materials to be blended with proppant material.

Samples of flowback proppant collected from the field may be analyzed according to a process known as the inductively-coupled plasma (ICP) discharge method to determine from which proppant stage and which production zone the proppant has been produced. According to the ICP discharge method, an aqueous sample is nebulized within an ICP spectrometer and the resulting aerosol is transported to an argon plasma torch located within the ICP spectrometer. The ICP spectrometer measures the intensities of element-specific atomic emissions produced when the solution components enter the high-temperature plasma. An on-board computer within the ICP spectrometer accesses a standard calibration curve to translate the measured intensities into elemental concentrations. ICP spectrometers for use according to the ICP discharge method are generally commercially available from the Thermo ARL business unit of Thermo Electron Corporation, Agilent Technologies and several other companies. Depending upon the model and the manufacturer, the degree of sensitivity of currently commercially available ICP spectrometers can generally detect levels as low as 1 to 5 parts per million for most of the metals listed above.

It is understood that depending on the materials used as tagging agents, other spectroscopic techniques well known to those skilled in the art, including atomic absorption spectroscopy, X-ray fluorescence spectroscopy, or neutron activation analysis, can be utilized to identify these materials.

According to yet another embodiment, an oil-soluble or oil-dispersible tracer comprising a metal salt, metal oxide, metal sulfate, metal phosphate or a metal salt of an organic acid can be used to tag the proppant by intimately mixing the metal with a curable resin prior to coating the curable resin onto the proppant. Preferably, the metal is selected from the Group VIB metals, the Group VIIB metals, and the lanthanide series of rare earth metals. Specifically, the metal according to this embodiment may be chromium, molybdenum, tungsten, manganese, technetium, rhenium, lanthanum, cerium, praseodymium, neodymium, promethium, samarium, europium, gadolinium, terbium, dysprosium, holmium, erbium, thulium, ytterbium and lutetium. It is preferred that the metals according to this embodiment, do not constitute a component of the proppant, the fracturing fluid or the reservoir fluid, and that the metals are compatible with the fracturing fluid.

Preferably, the organic acid is a substituted or unsubstituted carboxylic acid. More preferably, the organic acid may be selected from alkanoic and alkenoic carboxylic acids, polyunsaturated aliphatic monocarboxylic acids and aromatic carboxylic acids. Most preferably, the alkanoic carboxylic acids have from 5 to 35 carbon atoms, the alkenoic carboxylic acids have from 5 to 30 carbon atoms, the polyunsaturated aliphatic monocarboxylic acids may be selected from the group of sorbic, linoleic, linolenic, and eleostearic acids and the aromatic acids may be selected from the group of benzoic, salicylic, cinnamic and gallic acids. Suitable organic acids are generally commercially available from Sigma-Aldrich, Inc. as well as from Mallinckrodt Baker, Inc.

For proppant to be coated with a curable resin, the tracer agent is blended homogeneously with the resin mixture and the resin is then coated onto the proppant. The proppant can be pre-coated as in the case of curable resin-coated proppants, for example, such as those commercially available from Santrol or Acme Borden, or it can be coated on-the-fly during the fracturing job treatment. The nature of the resin materials and the processes for performing the coating process is well know to those skilled in the art, as represented by U.S. Pat. No. 5,609,207 to Dewprashad et al., the entire disclosure of which is hereby incorporated herein by reference. Also, it is understood that materials to be blended with proppant such as the fibrous materials, tackifying agents or deformable beads disclosed in U.S. Pat. No. 6,328,105 to Betzold, U.S. Pat. No. 6,172,011 to Card et al. and U.S. Pat. No. 6,047,772 to Weaver et al., the entire disclosures of which are hereby incorporated by reference, can be similarly treated with a tracer agent.

According to still another embodiment, the metal elements or their derivative compounds can be tagged as part of the manufacturing process of proppant. As a result, the proppant is tagged with a permanent tracer.

According to yet another embodiment, the proppant can be coated with phosphorescent, fluorescent, or photoluminescent pigments, such as those disclosed in U.S. Pat. No. 6,123,871 to Carroll, U.S. Pat. No. 5,498,280 to Fistner et al. and U.S. Pat. No. 6,074,739 to Katagiri, the entire disclosures of which are hereby incorporated herein by reference. According to this embodiment, the phosphorescent, fluorescent, or photoluminescent pigments maybe prepared from materials well known to those skilled in the art including but not limited to alkaline earth aluminates activated by rare earth ions, zinc sulfide phosphors, aluminate phosphors, zinc silicate phosphors, zinc sulfide cadmium phosphors, strontium sulfide phosphors, calcium tungstate phosphors and calcium sulfide phosphors. Suitable phosphorescent, fluorescent and photoluminescent materials are commercially available from Keystone Aniline Corporation (TB Series) and Capricorn Chemicals (H Series and S Series Glowbug Specialty Pigments). The particular structure of the materials has a strong capacity to absorb and store visible light such as sunlight or light from artificial lighting. After absorbing a variety of such common visible light the phosphorescent, fluorescent, or photoluminescent materials will glow in the dark. Various pigment colors can be combined with the luminescent capability of the materials to enhance the differentiation of the stages or zones. According to this embodiment, micron sized particles of the phosphorescent, fluorescent, or photoluminescent materials are intimately mixed with a resin to be coated onto a proppant to be used in a fracturing treatment.

According to still another embodiment, proppant materials having a naturally dark color can be dyed or coated with a marker material having a bright, vivid and intense color which marker material may be selected from oil soluble dyes, oil dispersible dyes or oil dispersible pigments. Suitable oil soluble dyes, oil dispersible dyes and oil dispersible pigments are well known to those skilled in the art and are generally commercially available from Keystone Aniline Corporation and Abbey Color. According to this embodiment, proppant materials having a dark color, such as bauxite proppant which is naturally black in color, are dyed or coated with such marker materials. In this regard, reference is made to the dyes disclosed in U.S. Pat. No. 6,210,471 to Craig, the entire disclosure of which is hereby incorporated herein by reference.

According to all of the above-described embodiment, the proppant material may comprise substantially any substrate material that does not undesirably chemically interact with other components used in treating the subterranean formation. It is understood that the proppant material may comprise sand, ceramics, glass, sintered bauxite, resin coated sand, resin beads, metal beads and the like.

The following examples are illustrative of the methods and compositions discussed above.

EXAMPLE 1

$ZnCl_2$ was selected to tag 50,000 gallons of a base fracturing fluid. For a 100-ppm concentration of $ZnCl_2$ in the fracturing fluid, it requires 0.2084 gram per liter of fluid, or 39.44 kg for the total fluid volume. This amount of $ZnCl_2$ is dissolved in 50 gallons of fluid, and the mixed solution is metered into the base fluid line at a rate of 1 gallon for every 1,000 gallons of the base fluid.

A number of methods well known to those of ordinary skill in the art such as wet chemistry titration, colorimetry, atomic absorption spectroscopy, inductively coupled plasma (ICP) discharge, ion chromatography (IC), gas chromatography (GC), liquid chromatography (LC) and nuclear magnetic resonance (NMR), can be used to analyze the fluid samples produced from the well and to determine from which zones the fluid has been produced, and the theoretical production level of each zone in the well.

EXAMPLE 2

A total of three separate hydraulic fracturing treatments were performed in a subterranean formation penetrated by a well bore. For each fracturing treatment, sufficient metal tracer was added to a liquid hardenable resin to provide an initial concentration of 1000 ppm of the metal tracer in the resin treated proppant. Cuprous oxide, manganese oxide, and zinc oxide were used as tagging agents in fracturing treatments 1, 2, and 3, respectively. Samples of flowback proppant were collected during the flow back of the well. Each proppant sample was weighted and digested in concentrated nitric acid before being measured against known, calibrated metal concentrations according to the inductively coupled plasma (ICP) discharge method for the ARL Model 3410 ICP which is commercially available from the Thermo ARL business unit of Thermo Electron Corporation. Table 1 shows the concentrations of each metal obtained in each proppant flowback sample. The data indicated that the highest concentration of flowback proppant was produced from the interval of the well that was fractured in the second fracturing treatment.

TABLE 1

| Sample Number | Frac Treatment 1 Cu (ppm) | Frac Treatment 2 Mn (ppm) | Frac Treatment 3 Zn (ppm) |
|---|---|---|---|
| 1 | 1.9 | 217.3 | 11.5 |
| 2 | 2 | 219.2 | 11.8 |
| 3 | 2.8 | 120.5 | 9.1 |
| 4 | 3.1 | 204.1 | 12 |
| 5 | 670.6 | 382 | 24.1 |
| 6 | 51.6 | 214.1 | 15.3 |
| 7 | 7.3 | 234.5 | 13.3 |
| 8 | 2.7 | 437.7 | 17.1 |
| 9 | 2.3 | 183.8 | 11.9 |
| 10 | 2.7 | 220.2 | 12.8 |
| 11 | 2.9 | 465 | 19.3 |
| 12 | 2.1 | 408.1 | 17.4 |
| 13 | 2.7 | 577.2 | 19.3 |
| 14 | 3.1 | 410.2 | 18.2 |
| 15 | 2.3 | 342.9 | 40.2 |
| 16 | 2.1 | 299.8 | 14.9 |
| 17 | 6.5 | 296.8 | 12.5 |
| 18 | 2.1 | 494.8 | 18 |
| 19 | 51 | 385.8 | 16.5 |
| 20 | 2.7 | 443.8 | 17 |
| 21 | 2.8 | 564.8 | 44.6 |
| 22 | 35.5 | 551.8 | 16.1 |
| 23 | 2.4 | 545.8 | 23.3 |
| 24 | 2 | 538.8 | 14.7 |
| 25 | 181 | 342.8 | 16.6 |
| 26 | 1.5 | 119.8 | 10.3 |
| 27 | 1.4 | 34.8 | 11.9 |
| 28 | 1.9 | 204.8 | 43.2 |
| 29 | 2 | 240.8 | 13.7 |
| 30 | 2.4 | 175.8 | 11.3 |
| 31 | 7.5 | 171.8 | 10.9 |
| 32 | 2.3 | 57.8 | 7.7 |
| 33 | 5.8 | 192.8 | 17 |
| 34 | 1.7 | 188.8 | 12.1 |
| 35 | 1.9 | 115.8 | 9.6 |
| 36 | 2.1 | 168.9 | 11.1 |
| 37 | 1.6 | 245.3 | 13 |
| 38 | 1.7 | 173.9 | 11.6 |
| 39 | 1.9 | 219.4 | 12.9 |
| 40 | 1.9 | 224.6 | 12.6 |
| 41 | 2 | 383.3 | 17.1 |
| 42 | 1.7 | 284.7 | 12.5 |
| 43 | 1.9 | 270.6 | 13.4 |
| 44 | 2.4 | 311 | 12.7 |
| 45 | 1.9 | 177.1 | 10.3 |
| 46 | 1.8 | 304.2 | 12.9 |
| 47 | 2.4 | 343.2 | 13.3 |
| 48 | 2 | 308.2 | 12.6 |
| 49 | 5.4 | 241.6 | 11.2 |
| 50 | 3.4 | 209.1 | 11.4 |
| 51 | 3.3 | 217.1 | 11.1 |
| 52 | 1.9 | 299.7 | 12.7 |
| 53 | 2.3 | 228.6 | 11.4 |
| 54 | 1.5 | 162.8 | 10.1 |

EXAMPLE 3

A total of five separate hydraulic fracturing treatments were performed in a subterranean formation penetrated by a well bore. For each fracturing treatment, sufficient metal tracer was added to the liquid hardenable resin to provide an initial concentration of 1000 ppm of the metal tracer in the resin treated proppant. Manganese oxide, cuprous oxide, zinc oxide, magnesium oxide, and barium oxide were used as tagging agents in fracturing treatments 1 through 5, respectively. Samples of flowback proppant were collected during the flow back of the well. Each proppant sample was weighted and digested in concentrated nitric acid before being measured against known, calibrated metal concentrations according to the inductively coupled plasma (ICP) discharge method for the ARL Model 3410 ICP which is commercially available from the Thermo ARL business unit of Thermo Electron Corporation. Table 2 shows the concentrations of each metal obtained in each proppant flowback sample. The data indicated that the highest concentration of flowback proppant was produced from the intervals of the well that were fractured in fracturing treatments 1 and 5.

TABLE 2

| Sample Number | Frac Treatment 1 Mn (ppm) | Frac Treatment 2 Cu (ppm) | Frac Treatment 3 Zn (ppm) | Frac Treatment 4 Mg (ppm) | Frac Treatment 5 Ba (ppm) |
|---|---|---|---|---|---|
| 1 | 256.9 | 7.3 | 18.2 | 26.8 | 106.2 |
| 2 | 210.3 | 14.5 | 23.1 | 24 | 110.6 |
| 3 | 164.5 | 12.4 | 20.2 | 22.5 | 94.8 |
| 4 | 236.5 | 9.1 | 19.9 | 23.3 | 100.4 |
| 5 | 97.8 | 10.5 | 14.7 | 19 | 105.7 |
| 6 | 288.9 | 2.8 | 15.8 | 25.4 | 110.4 |
| 7 | 202.8 | 172.8 | 12.1 | 21.3 | 99.7 |
| 8 | 221.3 | 3 | 12.8 | 22.3 | 115.9 |
| 9 | 167.9 | 2.9 | 12.5 | 21.8 | 115.7 |
| 10 | 236.1 | 2.2 | 12.5 | 22.8 | 90.7 |
| 11 | 162.6 | 1.6 | 10.8 | 19.5 | 85.9 |
| 12 | 111.8 | 1.6 | 8.9 | 18.8 | 74.9 |
| 13 | 231.8 | 1.7 | 11.5 | 21.7 | 86.7 |
| 14 | 246.9 | 2.5 | 13.1 | 24.4 | 98.3 |
| 15 | 348.2 | 2 | 13.5 | 26.8 | 112.8 |
| 16 | 273.5 | 2.4 | 12.4 | 24.4 | 101 |
| 17 | 221.5 | 2 | 11.4 | 29.3 | 83.8 |
| 18 | 268 | 1.4 | 11.9 | 25.8 | 88.4 |
| 19 | 177.8 | 1.8 | 10.4 | 22.3 | 77.8 |
| 20 | 247.5 | 2.4 | 11.3 | 28 | 92.2 |
| 21 | 132.8 | 1.8 | 10 | 22.2 | 72.4 |
| 22 | 165.8 | 2.3 | 9.4 | 20.9 | 75.3 |
| 23 | 306.9 | 66.4 | 11.9 | 28.7 | 103.8 |
| 24 | 205.7 | 1.6 | 9.4 | 23 | 87.1 |
| 25 | 241.2 | 2.6 | 10.6 | 23.4 | 90.4 |
| 26 | 197.6 | 2.2 | 10.1 | 24.1 | 88 |
| 27 | 242 | 2.3 | 10.7 | 26.2 | 98.9 |
| 28 | 202.8 | 3 | 10.8 | 24.6 | 94.6 |
| 29 | 165.7 | 2 | 9 | 20.7 | 85.5 |
| 30 | 138.3 | 1.4 | 8.7 | 21.3 | 76.1 |
| 31 | 227.4 | 1.5 | 10.3 | 24 | 92.8 |
| 32 | 192.1 | 1.7 | 9.8 | 23.5 | 86.6 |
| 33 | 201.9 | 1.2 | 9.6 | 22.3 | 86.4 |
| 34 | 138.4 | 1.7 | 8.6 | 19.8 | 73.9 |

VARIATIONS AND EQUIVALENTS

Although only a few exemplary embodiments have been described in detail above, those skilled in the art will readily appreciate that many other modifications are possible in the exemplary embodiments without materially departing from the novel teachings and advantages described herein. Accordingly, all such modifications are intended to be included within the scope of the following claims.

What is claimed is:

1. A traceable treatment composition for treating a subterranean formation having multiple zones penetrated by a well bore comprising a homogenous blend of a tracking composition and a liquid, hardenable resin composition, and wherein the tracking composition comprises a substantially non-radioactive tracking material selected from the group consisting of:

metal salt wherein a metal portion of the metal salt is vanadium; and, a metal salt selected from the group consisting of barium bromide, barium iodide, chromium bromide, chromium chloride, chromium iodide, manganese bromide, sodium monofluoroacetate, sodium trifluoroacetate, sodium 3-fluoropropionate, potassium monofluoroacetate, potassium trifluoroacetate, and potassium 3-fluoropropionate; and, wherein the traceable treatment composition is capable of being detected in a fluid produced from a subterranean formation.

2. A traceable treatment composition according to claim 1 further comprising a treatment fluid selected from the group consisting of fracturing fluids, drilling fluids, disposal fluids and injection fluids.

3. A traceable treatment composition according to claim 1, wherein the treatment composition further comprises a particulate material having a tracking material coated thereon.

4. A traceable treatment composition according to claim 1, further comprising a particulate material associated with the tracking material, and wherein the particulate material is selected from the group consisting of fibrous materials and deformable beads.

* * * * *